C. DE L. RICE.
TYPE WRITING MACHINE.
APPLICATION FILED NOV. 23, 1908.
944,746.
Patented Dec. 28, 1909.
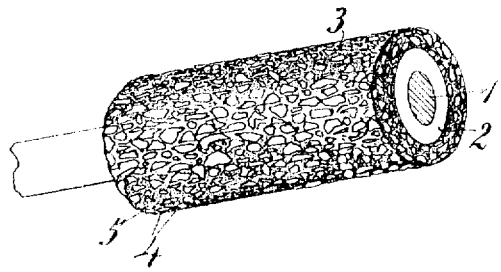
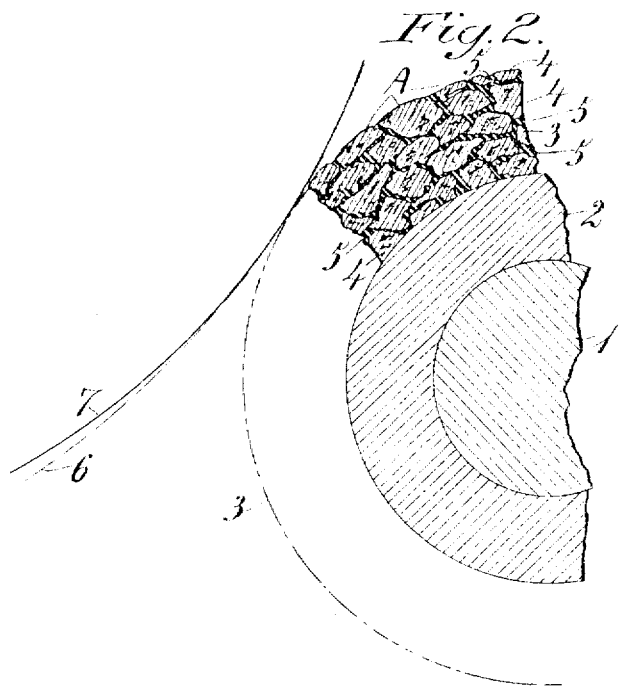

UNITED STATES PATENT OFFICE.

CHARLES DE LOS RICE, OF HARTFORD, CONNECTICUT, ASSIGNOR TO UNDERWOOD TYPEWRITER COMPANY, OF NEW YORK, N. Y., A CORPORATION OF NEW JERSEY.

TYPE-WRITING MACHINE.

944,746.  Specification of Letters Patent.  Patented Dec. 28, 1909.

Application filed November 23, 1908. Serial No. 464,113.

*To all whom it may concern:*

Be it known that I, CHARLES DE LOS RICE, a citizen of the United States, residing in Hartford, in the county of Hartford and State of Connecticut, have invented certain new and useful Improvements in Type-Writing Machines, of which the following is a specification.

This invention relates to the paper-feeding pressure rolls which run upon the revoluble platens of typewriting machines. Such rolls have usually been made of a soft-rubber compound, which, although making a defective roll, is yet costly, and is also so heavy as to be objectionable in machines where the platens are mounted on letter-feeding carriages, which must start and stop quickly, and should not therefore be heavily burdened. The defect in the rubber roll develops some months after its manufacture, and is due to the gradual working out from the rubber of the sulfur, etc., used for vulcanizing the same. The rolls come to have a slippery surface by reason of the "blooming" of the sulfur, etc., particularly after the roll has been in use for a considerable period; and such surface renders the roll untrustworthy for feeding the paper, because of the slip that is liable to occur between the paper and the unctuous surface of the roll. A further defect arising from the working out or "blooming" of the sulfur is that the rubber-compound itself deteriorates, becomes too soft and even so plastic as to be useless. A further serious difficulty with rubber rolls is found in the case of machines which are frequently used for writing stencils, since the stencil sheets are usually permeated by the compound of paraffin, etc., which attacks the rubber of the rolls, and soon renders them totally unfit for use.

The main object of the present invention is to construct a paper-feeding roll which will have the same grip upon the surface of the paper as is possessed by soft-rubber when it is newly manufactured, but which will possess none of the defects above recited, and which will be unobjectionable, and retain its desirable qualities for an indefinite length of time.

In the accompanying drawings, Figure 1 is a perspective view of the roll. Fig. 2 is an enlarged section of a paper-feeding pressure-roll for typewriting machines, made in accordance with the invention.

The roll, which is provided with an axle 1, usually comprises a core 2. Upon this is secured a yielding body, shell or peripheral portion 3, which consists of a compound of granulated or finely divided cork 4, and any suitable soft-rubber compound 5 vulcanized thereto. The cork is preferably rather coarsely granulated, the particles being of say from one-sixteenth to one-eighth of an inch in diameter; and the bulk of the rubber in the mixture may be equal from one-fourth to one-third of the bulk in the cork. Sufficient rubber is used to form a cement to bind the cork particles together; but the rubber needs to be little, if any, in excess of what is required for the purpose of cementing. The rolls may be manufactured by mixing the granulated cork with a suitable raw compound of rubber, and then forcing the mixture through an ordinary tubing machine, and subjecting the resultant tube to vulcanization, and then cutting it up into lengths to form bodies or shells for the rolls.

The cork, which forms the principal portion of the peripheral surface of the roll, has a clinging quality and is an excellent substance for gripping the surface of the paper 6, which is wrapped around the usual revoluble platen 7 of the typewriting machine; and this gripping characteristic is proved by tests to be substantially permanent, so that after long use the roll is substantially as effective as when it is newly manufactured.

The rubber that is in the roll is found to be not so subject to deterioration from "blooming" as where the roll is made entirely of the usual rubber compound; and such deterioration as may occur is negligible, because the bulk of the roll is made up of cork which does not "bloom", and retains its springy firmness.

The cork at the surface of the roll is not liable to set when left for a long time pressing against the platen without revolving, because it is backed by an underlying firm body (consisting of the compound of rubber and cork), so that any tendency of the surface cork to flatten out is overcome, and the roll caused to regain quickly its round shape.

The cork is not affected by waxed stencil sheets; and the action of the latter on the rubber portion of the mixture is not so serious as to detract from the usefulness of the roll, because there is so little rubber in the mixture.

After the rubber shell is secured upon the core, the roll is ground to the proper diameter; and as a result of the grinding, the roll is left with the cork particles slightly protruding above the rubber, as indicated at A, so that in practice, the entire gripping surface of the roll consists of cork, and the gripping quality is enhanced by reason of the pebbled or roughened surface given to the roll by such protrusion of the cork particles. Moreover such "bloom" as may come upon the portions of the rubber cement that occupy the slight depressions between the protuberant cork particles, does not glaze the main surface of the roll; and the surface of the waxed stencil sheets does not readily come into contact with the depressed rubber portions of the roll to injure the same.

The described protrusion of the cork above the rubber portion of the roll periphery is more noticeable, and hence more advantageous, where the cork particles are of about one-eighth of an inch in diameter, and of about uniform size throughout the roll; and for this and other reasons this size of the cork particles is found to do excellent service.

The bulk of the roll is cork, which is very much lighter than rubber, and conduces to the lightness of the letter-feeding carriage (not shown) on which the platen is mounted. Moreover the expense of the roll is materially reduced, because cheap cork displaces expensive rubber.

It is not essential in all cases that the described ingredients be used for cementing the cork together; and certain variations may be resorted to within the scope of the invention.

Having thus described my invention, I claim:

1. The combination with the revoluble platen of a typewriting machine, of a paper-feeding pressure-roll to run thereon, the body or shell of said roll consisting principally of granulated or finely divided cork with sufficient yielding plastic material to bind the particles of cork together.

2. The combination with the revoluble platen of a typewriting machine, of a paper-feeding pressure-roll to run thereon, the body or shell of said roll consisting of granulated or finely divided cork mixed with soft rubber, the cork and rubber being vulcanized together and the cork forming a substantially larger proportion of the bulk than the rubber.

3. The combination with the revoluble platen of a typewriting machine, of a paper-feeding pressure-roll to run thereon, the body or shell of said roll consisting of granulated or finely divided cork mixed with soft rubber, the cork and rubber being vulcanized together and the cork forming a substantially larger proportion of the bulk than the rubber, the cork particles protruding slightly from the rubber, to constitute substantially the entire gripping or feeding surface of the roll.

4. The combination with the revoluble platen of a typewriting machine, of a paper-feeding pressure-roll to run thereon, consisting of a vulcanized compound of rubber and particles of cork to form a gripping surface on the roll, the rubber being only sufficient in quantity to cement the particles of cork together.

5. The combination with the revoluble platen of a typewriting machine, of a paper-feeding pressure-roll to run thereon, said roll consisting of a vulcanized mixture of granulated cork with a suitable soft-rubber compound, the rubber compound being from one-quarter to one-third of the bulk of the cork.

6. The combination with the revoluble platen of a typewriting machine, of a paper-feeding pressure-roll to run thereon, said roll consisting of a vulcanized mixture of granulated cork with a suitable soft-rubber compound, the rubber compound being from one-quarter to one-third of the bulk of the cork, the particles of cork being from about one-sixteenth to one eighth of an inch in diameter.

7. The combination with the revoluble platen of a typewriting machine, of a paper-feeding pressure-roll to run thereon, the peripheral or gripping surface of said roll consisting of cork particles held together by rubber and ground to size, to form a pebbled contour, substantially as set forth.

CHARLES DE LOS RICE.

Witnesses:
W. M. BYORKMAN,
LYMAN D. BROUGHTON.